Aug. 15, 1961  A. WERNER  2,995,859
TWO-STAGE SLIP-SLEEVE FISHING TACKLE
Filed Feb. 23, 1960
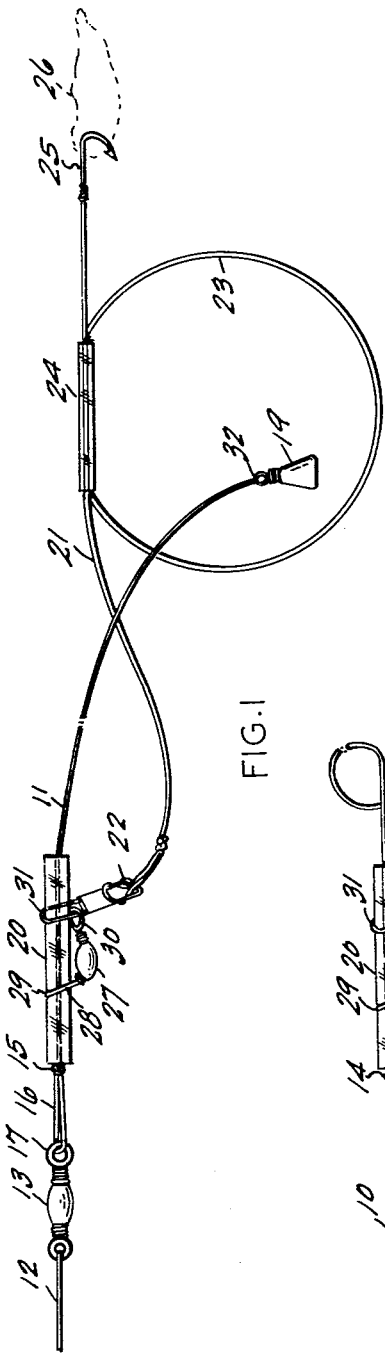
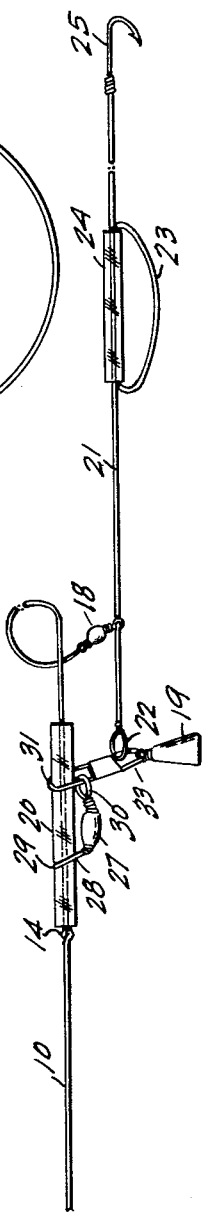
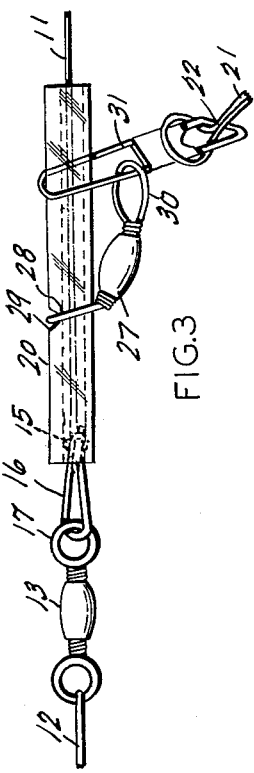
INVENTOR.
Albert Werner
BY
Philip O. Friedell
ATTORNEY

United States Patent Office 2,995,859
Patented Aug. 15, 1961

2,995,859
TWO-STAGE SLIP-SLEEVE FISHING TACKLE
Albert Werner, 41 Wayne Court, Walnut Creek, Calif.
Filed Feb. 23, 1960, Ser. No. 10,143
8 Claims. (Cl. 43—44.83)

This invention relates to improvements in methods of fishing, and particularly relates to an effective method of catching nibblers which, because of their wariness are seldom caught because a relatively free bait is required to entice them to strike sufficiently hard to cause them to be hooked, and further concerns the effective hooking of striking fish which often are not effectively hooked by conventional tackle.

With the usual methods of fishing, particularly with casting lines, the hook is substantially loaded by the sinker so that the nibbler never has a chance to make a run with the hook and therefore continues to nibble away until the bait is consumed, or the fish abandons the bait because of its relative fixation, and a striking fish is caught up short when attempting a run with the bait, in fact, too short to effectively hook the fish.

The above mentioned shortcomings were partly solved by my Patent Number 2,674,824, issued April 13, 1954, which, following a jerk on the hook by the fish, would permit limited free movement of the hook, however, the initial jerk that was required to provide free payout of the hook often caused the fish to abandon the bait.

My Patent Number 2,700,843, issued Feb. 1, 1955, provided an improvement over the previous patent in the use of two hooks with one connected through a slip noose, however, this arrangement still failed to satisfactorily lure the fish to grab the bait and make a run with it as the payout was insufficient.

My invention provides a double payout of leader or line, the initial payout being substantially unresisting to lure the fish, which followed by a slight jerk by the fish frees a second payout which is entirely without resistance until its limit is reached when the fish is caught up with a sudden jerk, effectively hooking the fish.

The objects and advantages of the invention are as follows:

First, to provide a double payout connection from a fish line to a hook, with the payouts being sequential.

Second, to provide a connection as outlined in which initial payout is provided through a slip noose subject to slight resistance without affecting the second payout.

Third, to provide a connection as outlined with a second payout including a protuberance on the leader with a flexible sleeve slidable on the leader and frictionally engageable on the protuberance with the first payout connected to the said sleeve.

Fourth, to provide a fishline or the like with a protuberance, a sleeve engageable frictionally on the protuberance and slidable on the fish line or the like for secondary payout, and a leader connected to the sleeve and having a loop formed through a second sleeve for slight frictional payout and having a hook attached thereto.

In describing the invention reference will be had to the accompanying drawings, in which:

FIG. 1 is a side elevation of the invention with lines foreshortened.

FIG. 2 shows a modification of the invention in which the fishline is used as one member of the connection.

FIG. 3 is an enlarged fragmentary view of the sliding sleeve and its connections.

The invention is one form consists of a leader 11 which is attached to the fishline 12 through convential means means such as the swivel 13, with the knot 15 of the loop 16 which secures the leader 11 to the eye 17 of the swivel 13 functioning also as frictional restraining means.

A stop 32 is provided at the end of the leader 11 which is shown as the eye of a sinker 19 as shown in FIG. 1, the leader 11 having a sleeve 20 freely slidable thereon but frictionally engageable over the knot 15, the sleeve being preferably formed of flexible material such as a synthetic plastic, though a metal sleeve could be used. Suitable connecting means is provided on the sleeve 20 for connecting the leader 21 thereto as indicated at 22.

Another form of the invention consists of a fishline 10 having an enlargement such as a knot 14 to provide a friction member. A stop 18 is provided at the end of the fishline 10 and is shown as a swivel which connects the line to the leader 21.

The sleeve combinations are identical in FIGS. 1 and 2, the sleeve 24 restraining the double strand of leader under slight resistance while the sleeve 20 is freely slidable on the line or leader but is provided with a connection for tackle such as a leader or a sinker to the body of the sleeve. Thus the sleeve 20 is slidable on a line and has a fixed body connection for other tackle such as a leader or a sinker shown respectively in FIGS. 1 and 2.

A loop 23 is formed through a sleeve 24, the double strand through the sleeve providing just sufficient friction to prevent payout of the leader when the hook 25 with its bait 26 is cast.

The most satisfactory connection on the sleeve 20 consists of a swivel 27, one eye 28 of which is threaded onto the sleeve and engaged in a groove 29, with the other eye 30 engaged by a clip 31 which is freely suspended over the sleeve which insures maintenance of the eye 28 in the groove 29; however, any other suitable connection may be used. The sinker 19 may be attached to the end 32 of the leader 11 or to the depending end 33 of the clip 31, an alternative connection for the end of the line or primary leader being to the secondary leader through a swivel as indicated at 18.

For purposes of simplicity, the primary leader 11 may be considered as the end portion of the fish line, so that the invention consists of a two step sequential payout, the first step at 24 being under slight friction, just sufficient to maintain the loop 23 as the hook is cast and to resist the pull of flowing water on the hook and bait, but not sufficient to pull the end of the sleeve 20 off of the enlargement or knot 14 or 15, which enlargement or knot may be located at any desired position depending on the length of payout desired, usually about two feet, and the same applies to the loop 23.

In preparing the tackle for casting, the loop is formed to a maximum with the sleeve 24 practically up to the clip 33, and the sleeve 20 is retracted on the line and the knot pulled into the end of the sleeve as indicated in FIG. 3.

As illustrated in FIG. 1, nibbling of the bait 26 allows the bait to be pulled with only slight resistance which lures the fish eventually to grab the bait with its hook and make a dash, the initial pull of which pulls the sleeve off the knot with the sleeve sliding absolutely free on the line until the stop at 18 or 32 which stops the fish abruptly, causing the hook to engage firmly. In other words, the loop 23 may be considered a nibbling payout to lure the fish to make a run with the bait, while the slide 20 is a run and hook playout, the two following in sequence.

I claim:

1. Fishing tackle comprising a leader having a hook at one end, a sleeve on said leader said leader having a loop formed by return passage through said sleeve with the double strand of the leader within the sleeve frictionally restraining the loop under slight resistance for payout under nibbling conditions, and a line having a slider thereon and frictionally securable in a predetermined position on the line and releasable through a further pull on the hook following complete retraction of the loop and having the other end of said leader attached thereto, and stop means for said slider for abruptly terminating the run of a fish for hooking the fish.

2. Fishing tackle comprising a hook and a line, a leader for said hook, a sleeve slidable on said leader, said leader being return threaded through said sleeve to form a loop, with the loop being manually enlargeable to retract the hook at will, means for retaining said loop under slight friction to permit payout through nibbling on the hook, and a slider on said line and having said leader attached thereto and including means frictionally retaining said slider in a predetermined position on said line and releasable through a pull on said hook after the leader has been extended through nibbling with said slider permitting free run of the hook until the terminal of the line is reached, and stop means on said terminal.

3. Fishing tackle including a fish line, a leader, a hook, a first sleeve on said leader, and a second sleeve on said fishline, providing an intervening two-stage sequential payout with an initial payout operating under slight resistance in said first sleeve and the second stage releasable in said second sleeve under increased resistance following the initial payout and operating freely thereafter for continued payout and including stop means cooperative with said second sleeve for limiting the degree of payout of the second stage.

4. Fishing tackle comprising a fish line having a terminal end including stop means, an enlargement formed on said fish line in spaced relation to said stop means, a slider on said fish line having one end frictionally engageable on said enlargement, a sleeve, a leader return threaded through said sleeve to form a loop, said leader having a hook at one end with the other end attached to said slider, with said loop retractable under nibbling conditions on the hook and with just sufficient resistance to maintain the loop in expanded position when casting and against the pull on the hook by relatively flowing water, with said slider being releasable from said enlargement by additional pull on the hook by a fish following complete retraction of the loop, for free and unrestricted payout for the hook until said stop means is contacted by said slider, for abrupt stopping and hooking of a fish.

5. A structure as defined in claim 4, said slider having a recess formed in the wall thereof, a clip suspended on said slider and having the other end of said leader attached thereto, and a swivel having an eye at each end with one eye threaded over said slider in spaced relation to said clip and engaged in said recess and the other eye connected to said clip, said combination providing the attachment for the other end of the leader to said slider.

6. Fishing tackle comprising a line having stop means adjacent the terminal end thereof and frictional engaging means in spaced relation thereto, a slider on said line and having one end engageable on said frictional engaging means and freely slidable between said frictional engaging means and said stop means, and a leader having one end connected to said slider and having a hook at the other end, a sleeve slidable on said leader, with the leader return threaded through the sleeve to form a loop, and with the return threaded strands of the leader restrained under slight frictional resistance for payout through nibbling on the hook said slider being releasable from said frictional engaging means through a slight pull on said hook by a fish, and abruptly stopping and hooking the fish as the slider engages said stop means.

7. Fishing tackle comprising a line having stop means adjacent the terminal end thereof and frictional engaging means in spaced relation thereto, a slider on said line and having one end engageable on said frictional engaging means and freely slidable between said frictional engaging means and said stop means, and a leader having one end connected to said slider and having a hook at the other end, said slider being releasable from said frictional engaging means through a slight pull on said hook by a fish, and abruptly stopping and hooking the fish as the slider engages said stop means, said leader being connected to said slider through a connection comprising a swivel having an eye at each end with the eye at one end anchored to said slider, a clip suspended on said slider and having the other eye of said swivel connected thereto, with the leader connected to said clip.

8. A two-stage sequential payout for a fish hook comprising a first stage consisting of a leader having a hook at one end and having a loop and means associated with said leader for maintaining said loop against contraction under slight resistance, and a second stage consisting of a fish line or the like having a terminal end including stop means, and having a slider operable thereon and having the other end of said leader connected to said slider, and retaining means on said line cooperative with said slider for releasably retaining said slider in spaced relation to said stop means and under increased resistance to release in relation to the release of said loop, with said slider operating freely to said stop means following release from said retaining means through a pull on the hook after contraction of the loop.

References Cited in the file of this patent

UNITED STATES PATENTS

| | | |
|---|---|---|
| 676,962 | Payton | June 25 1901 |
| 1,296,057 | Ellsworth | Mar. 4, 1919 |
| 1,863,125 | Powell | June 14, 1932 |
| 2,220,559 | Voigt | Nov. 5, 1940 |
| 2,674,824 | Werner | Apr. 13, 1954 |
| 2,700,843 | Werner | Feb. 1, 1955 |
| 2,766,547 | Gallagher | Oct. 16, 1956 |
| 2,861,382 | Rosenberg | Nov. 25, 1958 |
| 2,918,745 | Haynie | Dec. 29, 1959 |

FOREIGN PATENTS

| | | |
|---|---|---|
| 800,436 | France | May 4, 1936 |